Figure 1:
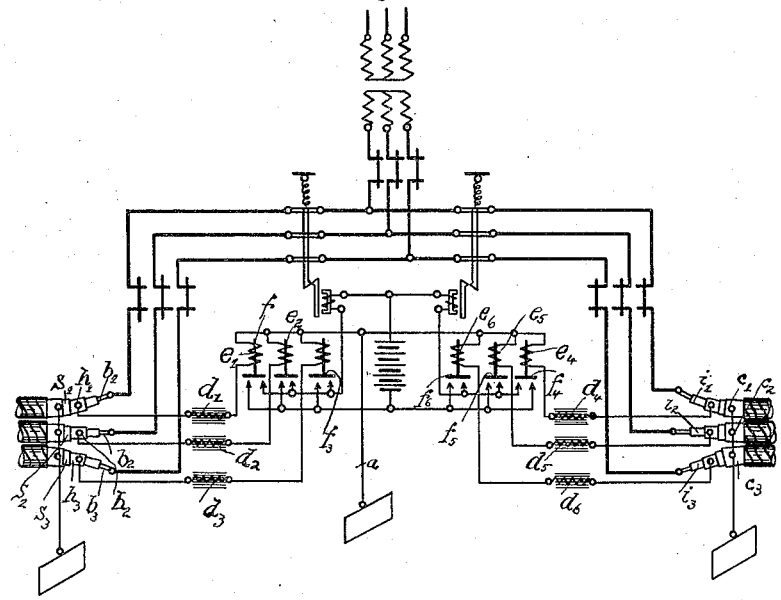

M. HÖCHSTADTER.
SAFETY CONNECTION FOR ELECTRIC MAINS.
APPLICATION FILED JULY 25, 1911.

1,154,394.

Patented Sept. 21, 1915.
2 SHEETS—SHEET 1.

M. HÖCHSTADTER.
SAFETY CONNECTION FOR ELECTRIC MAINS.
APPLICATION FILED JULY 25, 1911.
1,154,394.
Patented Sept. 21, 1915.
2 SHEETS—SHEET 2.
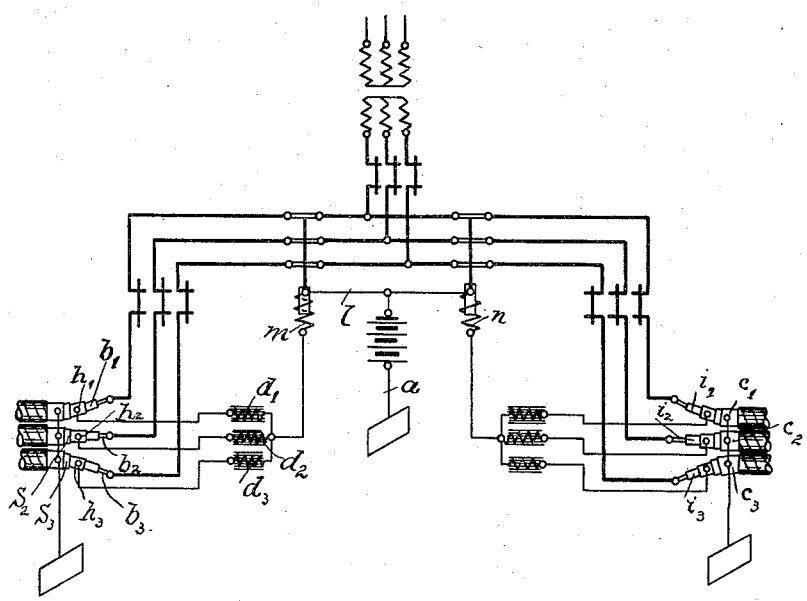
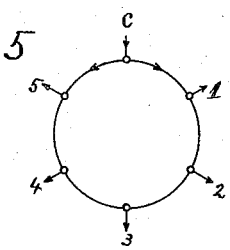
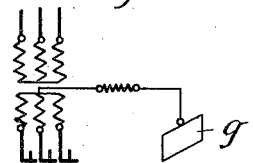
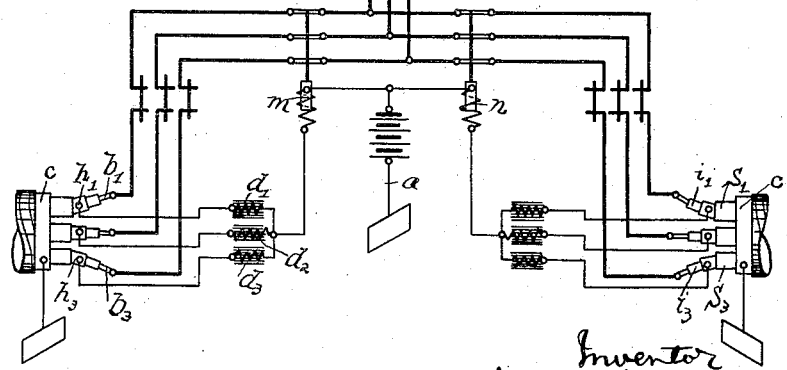
Witnesses
H. H. Knight.
Ray J. Ernst.
Inventor
Martin Höchstädter
By his attorneys
Knight & Bros.

UNITED STATES PATENT OFFICE.

MARTIN HÖCHSTÄDTER, OF BERLIN, GERMANY, ASSIGNOR TO SIEMENS-SCHUCKERT-WERKE G. M. B. H., OF BERLIN, GERMANY, A CORPORATION OF GERMANY.

SAFETY CONNECTION FOR ELECTRIC MAINS.

1,154,394.     Specification of Letters Patent.     Patented Sept. 21, 1915.

Application filed July 25, 1911. Serial No. 640,476.

*To all whom it may concern:*

Be it known that I, MARTIN HÖCHSTÄDTER, a subject of the German Emperor, and residing at Berlin, Germany, have invented certain new and useful Improvements in Safety Connections for Electric Mains, of which the following is a specification.

My invention relates to a safety connection for electric mains, and a primary object is to automatically disconnect from the system only the injured portion of the main when its insulation is mechanically or electrically broken down.

The arrangement according to my invention substantially consists in the addition to each main, aside from the usual metallic protective coverings or armoring, of a special auxiliary conductor in the form of an electrically conducting layer located in the insulation proper, the potential of which layer is varied by the current due to the leakage and which causes the automatic disconnection of the defective length of main. The electrically conducting layer does not appreciably diminish the flexibility of the cable. Moreover, it is so disposed that it is encountered with certainty by the arc which is produced between the main conductor and the outer metallic armor whenever the insulation is punctured and it is thus electrically connected with the armor. Accordingly, it is preferably made as a thin metallic layer surrounding the conductor concentrically with the latter's longitudinal axis. In order to conveniently connect circuit breakers or other suitable apparatus in circuit with the aforementioned conducting layers, I connect induction coils or similar suitable devices for operating the circuit breakers, with the conductive layers of the mains at the points where they emerge from their protecting coverings. Now if, for example, in a single cable line an auxiliary conductor is connected with the ground at such a point by a grounded conductor or attached to the one pole of a source of current whose other pole is grounded, the above-mentioned arc can be used for starting the disconnecting operation. The arc may for instance render ineffective a closed circuit current by short-circuiting it, or it may close a superposed open circuit current by bridging over a break provided for the purpose, the arrangement in each instance in accordance with the character of the disconnecting devices. In both instances the advantage is obtained that the start of the disconnecting operation is independent of accident, because whenever a puncture is made an arc is formed generally between the main conductor and the outer covering and simultaneously between the auxiliary conductor and the outer covering, and also because the current due to the leakage is employed only as the electrical connection for closing or short-circuiting the working circuit, but not for operating the disconnecting means itself. Consequently, in the present arrangement no attempt is made to control the amount of current due to the leakage. This would also serve no purpose, because the beginning of the disconnecting operation is independent of the kind and extent of the destruction of the cable at the defective portion; of course the disconnecting relays will operate the more readily and rapidly the better the arc is which is formed by the leakage current between the electrically conducting layer and the outer metallic covering. When the electrically conducting layers are skilfully arranged they must become fused with the outer metallic covering of the one or more cables when the latter are punctured. Obviously, these principal features of the invention admit of great freedom in selecting the disconnecting device and in constructing the remainder of the disconnecting circuit.

Several illustrative embodiments of the invention are represented in the accompanying drawings, wherein:—

Figure 2:
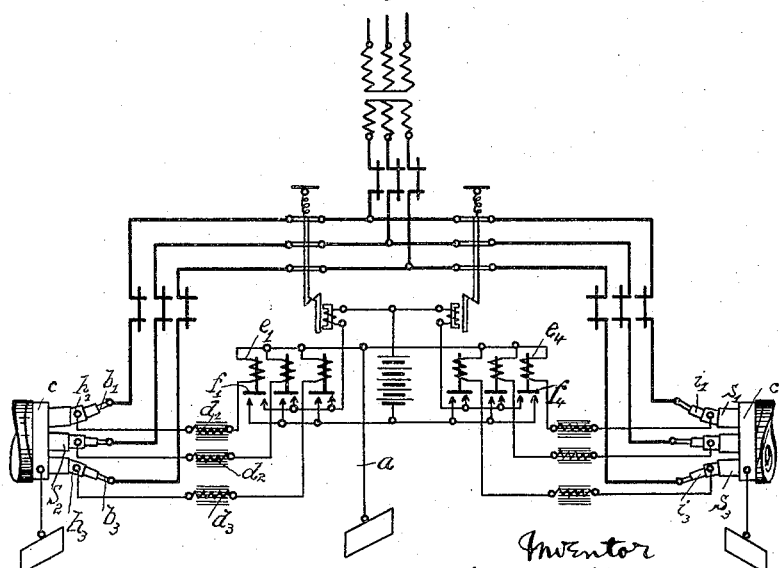

Figures 1 and 2 are diagrams showing two arrangements of connections for closed circuit currents, Figs. 3 and 4 are diagrams showing two arrangements of connections for open circuit currents, and Fig. 5 is a diagram explained hereinafter. Fig. 6 is a diagram similar to that shown in Fig. 3 illustrating the use of an auxiliary alternating current source.

In each illustrative embodiment is shown a branching point leading off the main and between two of such points a cable section is confined of which any desired number may be thought of as connected in series or in parallel in the system. Fig. 5 indicates a closed ring main having five of such branching points indicated by the numerals 1 to 5 and also the point of connection with the feeder C through which in the usual way power is supplied to the ring main. The energy in the feeder C flows in two directions in the ring main, as indicated by the arrows. The direction of the energy flowing between the points of consumption is unknown, in the case of a closed ring, without knowing the resistance of the mains and the individual values of the amount of energy consumed. In all the five illustrative embodiments it is assumed that three-phase current is supplied. In the diagrams according to Figs. 1 and 3 the three-phase main consists of three single unarmored lead-covered cables and in those according to Figs. 2 and 4 of a twisted triple cable armored with iron ribbon. The described arrangements can also be employed for alternating current of any desired number of phases, and the arrangement according to Figs. 3 and 4 can be used for direct current. The cable lines which I use differ from ordinary cables owing to the good electrically-conducting metallic layers which are embedded, according to my invention, in the insulation of the individual conductors and separated by a layer of insulation in each case from the lead covering, and in twisted cables from both the lead covering and the metallic layers of the other conductors. In single cables (Fig. 1), each conductor proper $b^1$, $b^2$, $b^3$, supplying energy carries a layer of insulation $i_1$, $i_2$, $i_3$, then the metallic layer $h_1$, $h_2$, $h_3$, then a second, in general thin layer of insulation $s_1$, $s_2$, $s_3$, and lastly the lead covering $c_1$, $c_2$, $c_3$. In multiple cables, the individual conductors after being provided, as described, with a layer of insulation, then the metallic layer and a second layer of insulation, are twisted in the usual manner, provided with a common layer of insulation and then with a common lead covering $c$ which may be wound with additional coverings, iron ribbon and jute. In the arrangement according to Figs. 1 and 2, each of the electrically-conducting layers $h_1$, $h_2$, $h_3$ of the six ends of the cables to be connected is connected by way of a choking coil $d_1$ to $d_6$ respectively to a common grounded wire $a$. The choking coils, may, however, be dispensed with if desired when the layers $h_1$ to $h_3$ themselves produce a sufficient choking action, that is to say the choking coils and the layers may thus be combined with each other. The purpose of these choking coils is to prevent the current due to the fault from flowing through the tripping coils, operating the circuit breakers. In the diagrams according to Figs. 1 and 2 when the cable line is free from leakage the current flowing in the coils $e_1$ to $e_6$, as will be explained later, holds a member for starting the cut out operation in its inoperative position. Such a member may be a switch which, when released, closes an auxiliary electric circuit and thereby causes a secondary cut out relay to operate the section switch. This arrangement is shown here, as is indicated by the switches $f_1$ to $f_6$. These switches shown as controlled by the coils $e$ may, however, if preferred be connected with a purely mechanical device for opening the section switches; consequently, in this connection the auxiliary source of current $o$ does not constitute an essential part of the arrangement. In the present case, where a battery is arranged as shown in Figs. 1 and 2, it is in circuit with two electromagnets $t_1$, $t_2$, each magnet forming its own circuit with the battery over contacts $w_1$ and $w_2$ respectively, when the latter are closed. In this case armatures $v_1$, $v_2$ are attracted and thereby release switch bars $q_1$, $q_2$ so that the latter are drawn upward under the action of springs $p_1$, $p_2$ and thereby open their respective switches $G_1$, $G_2$. This operation takes place when relays $e_1-e_3$ or $e_4-e_6$ are deënergized so that they drop their armatures $f$ as previously described.

The connections represented in Figs. 1 and 2 are particularly characterized by the feature that the potential difference between the electrically-conducting layers owing to their being insulated from the ground, which difference I shall hereinafter term "capacity tension", is used here for producing the normal energizing current for relays $e_1-e_6$. They are therefore suitable for only alternating current systems. In such systems a static charge is produced in the auxiliary conductor by influence action, the amount of which is determined by the thickness of the layers of insulation between the main conductor and the electrically-conducting layer on the one hand, and between the layer and the lead covering on the other hand. These charges become equalized by way of the choking coils $d_1-d_6$ and the coils $e_1-e_6$ to the ground and thus produce the constantly flowing current requisite in the coils $e_1-e_6$ for attracting the switches $f_1-f_6$. Now if the cable is punctured and leaks to ground, the capacity tensions, and when the star connection center in the central station is grounded, the principal tensions, are equalized along the more convenient path to the ground by way of the arc formed by the leakage current and the good electrically-conducting outer covering $c$. In this manner the grounded conductors are short-circuited by way of the choking coils $d$ and the coils $e$ at the two ends of the defective cable, the appertaining switches $f$ are released and cause the nearest section switch to be opened.

In the arrangements according to Figs. 3 and 4, a special auxiliary source of current $o$ is provided as an essential constituent. As compared with the arrangement according to Figs. 1 and 2 this has the advantage that the connections can be employed for every kind of current, including direct current. In addition, owing to this arrangement the cut out is limited with absolute certainty to the two ends of the faulty section. The special feature of the connections according to Figs. 3 and 4 is that the electrically-conducting layers $h$ of all cable ends and their choking coils $d$ are connected behind the choking coils in star connection, and, owing to the neutral point thereby produced only one single connecting conductor $l$ and two cut out relays $m$ and $n$ are requisite for any desired frequency to connect the electrically conducting layers of all the phases. The one pole of the auxiliary source of current $o$ is connected between the two relays and its other pole may be connected by way of wire $a$ to the ground. The protective coverings of the cables $c_1$ to $c_3$ in Fig. 3 and $c$ in Fig. 4 are likewise grounded.

In the arrangements according to Figs. 3 or 4 when the cable leaks to ground, the arc produced closes the circuit of the auxiliary source of current between the conducting layer and the ground. The cut out relays $m$ and $n$ are thereby energized and the section switches opened. When the cable is free from faults a capacity tension of course exists in the layers $h$ when this connection is used in alternating current systems; this tension is equalized however by way of the choking coils connected in star connection, without passing to the cut out relays or to the auxiliary source of current. As the auxiliary current in these connections must flow by way of the choking coils $d$, the auxiliary source of current preferably supplies only direct current, or alternating current of a low frequency which is considerably less than the frequency of the main system. Such arrangement with an alternating current source of low frequency is shown in Fig. 6 which is otherwise similar to Fig. 3. Instead of the direct current source $o$ in Fig. 3 a low frequency alternating current source for instance dynamo $o'$ is connected in circuit.

In the above only the most important defects in practice, those from the main conductor to ground, have been mentioned. In multiple cables, however, leakages may occur between the twisted cables. This occurs rarely because an injury which will produce defects in two cables mostly destroys the entire group and produces a ground circuit. In the described connection, however, a safety arrangement can be made in a simple manner, also for this case, by connecting to ground a common point which is generally provided in the main system for protecting against excess voltage. A grounded neutral point may be provided at all or special sections of the cable. Such a ground $g$ is provided in Fig. 4 at the high tension winding of the station transformer. Assuming the existence of such a common point, in the arrangements according to Figs. 3 and 4, the circuit of the auxiliary source of current will then be connected in case of leakage between two individual mains by way of the ground wire $a$ and the auxiliary source of current $o$ to a cut out coil $m$ or $n$, by way of the two choking coils $d$ appertaining to the two defective cables, the two corresponding layers $h$, the two mains $i$ and the ground wire of the main system, so that the cut out device operates. In the arrangement according to Figs. 1 and 2, in the corresponding case the cut out would be brought about by the arc between the individual mains conducting the capacity current from the electrically-conducting layers $h$ by way of the main conductors $b$ of the injured cables to ground, so that the coils $e$ can obtain no more current and must allow the switches $f$ to fall. The grounding might here be omitted. For when short circuit occurs between conductor and conductor the capacity current is cut off from the coils $e$ owing to the path from the electrically conducting layers by way of the arc and the main conductors into the system being easier than the path by way of the choking coils of the auxiliary conductor.

In contradistinction to known arrangements, in the safety connections according to the invention special signal, measuring or like conductors are expressly avoided because such auxiliary conductors require special supervision and considerably increase the possibility of unforeseen and uncontrollable faults and disturbances. On the other hand, the closed auxiliary circuit provided according to the invention comprising the electrically-conducting layers connected in series, choking coils and cut out coils can be themselves used for such purposes if necessary. For instance by means of static voltmeters interposed between each auxiliary layer and the ground the condition of the insulation of the individual sections of the cable line and, in the case of polyphase cables, the insulation of the various phases can be constantly checked. Thus the layers may be used for a twofold purpose, an advantage not existing in any known safety connections. The above described arrangement, has, however, the disadvantage that in high tension systems only high tension apparatus can be connected to the auxiliary layers. In order to obviate this defect and to render the auxiliary layer accessible at any time, at least in alternating current systems, without the provision for low tension apparatus, according to the invention not ordinary choking coils are employed as the necessary choking members, but small transformers, e. g. measuring transformers, to which any desired low tension apparatus and measuring instruments can be connected. In this manner the auxiliary layer can be employed in all cases for any other desired purposes. Lastly, the present invention can also be used for protecting cables from purely mechanical injury of the common metallic outer coverings, e. g. lead sheaths, iron armor or the like. To this end, each cable is provided in its active insulation material below the common outer covering with an electrically conducting layer H of the type mentioned above which, like the outer covering, surrounds all the individual conductors in common, and, in addition, is connected with cut out apparatus, if necessary even with choking coils, like the electrically conducting layers surrounding the individual conductors. In consequence of this arrangement, when injuries occur through picks, spades and other tools, which frequently happens in building roads, foundations and the like, the electrically conducting implement or tool meets with the arc at the place where the cable is punctured and thus forms the bridge requisite for the disconnection between the electrically conducting layer and the metallic outer covering. The desired protection from mechanical injury is obtained more perfectly the nearer the electrically-conducting layer is placed to the outer electrically-conducting protective covering. It is preferable to diminish the distance between the electrically conducting layer and the protective covering as much as is possible in view of the manufacture of the cable and the safety of the same when laying it, for the nearer the electrically conducting layer is to the outer covering, the more readily will insignificant injuries of the outer covering operate the cut out device. Also, injuries owing to electrically non-conducting tools and even severe bulges and sharp bends in the outer protective covering will break through the insulating layer between the electrically-conducting layer and the outer covering and bring about the disconnection. Simultaneously, together with the reduction of the thickness of insulation between the electrically-conducting layer and the outer covering the tension permanently at the choking coil is diminished and consequently the choking coil is diminished in size, becomes less expensive to make and can be more readily insulated.

In systems comprising multiple cables, when employing one electrically-conducting layer with safety apparatus connected thereto, the electrically-conducting layers about the individual conductors, may be omitted according to the present invention. In this event the auxiliary layer for the safety connection is formed by the electrically conducting layer under the outer metallic protective coverings of the cables. This simplification is admissible when it is remembered that the electrically conducting layer provided according to the invention and surrounding all the individual conductors suffices in every case for bringing about the disconnection when a short circuit takes place between one energy conductor and the outer conducting coverings. The conducting layers around the individual conductors are requisite solely in case of leakages between two conductors of energy within the cable without the insulation of the conductors of energy against ground being broken down. But as a leakage between two conductors scarcely ever occurs in practice, as mentioned above, without destroying the insulation between the conductors of energy and the ground, in the arrangement of one common electrically conducting layer arranged in the manner last mentioned, the conducting layers around the individual conductors may be safely omitted.

I claim:—

1. In an electric supply system, the combination, with a cable line and section switches interpolated therein, of an electrically conducting layer in the insulation of each main conductor in the cable line, and grounded disconnecting means operatively connected with each section switch and electrically connected with the one or more electrically conducting layers for automatically opening the section switches at the ends of a cable section in which a fault occurs.

2. In an alternating current supply system, the combination, with a cable line, and section switches interpolated therein, of grounded, electromagnetically controlled, disconnecting means for opening each of the said section switches, and an electrically conducting layer in the insulation of each main conductor of the cable line connected with said disconnecting means, the current due to the potential difference between the one or more layers and the ground normally preventing said disconnecting means operating.

3. In an electric supply system, the combination, with a cable line and section switches interpolated therein, of disconnecting means comprising a grounded auxiliary source of current for opening each section switch, and an electrically conducting layer in the insulation of each main conductor of the cable line connected with said disconnecting means.

4. In an electric supply system, the combination, with a cable line and section switches interpolated therein, of disconnecting means comprising a grounded auxiliary source of current for opening each section switch, an electrically conducting layer in the insulation of each main conductor of the cable line connected with said disconnecting means, and a choking device interpolated between each electrically conducting layer and the appertaining disconnecting means.

5. In a permanently grounded electric supply system, the combination, with a cable line comprising a plurality of individual cables having a common grounding conductor, and a plurality of sets of section switches interpolated in the line, of disconnecting means comprising a grounded auxiliary source of current for opening each section switch, and an electrically conducting layer in the insulation of each individual cable of the cable line connected with said disconnecting means.

6. In a polyphase alternating current supply system, the combination, with a cable line, and section switches interpolated therein, of grounded, electromagnetically controlled, disconnecting means for opening each of the said section switches, and an electrically conducting layer in the insulation of each main conductor of the cable line connected in star connection with said disconnecting means, the current due to the potential difference between the one or more layers and the ground normally preventing said disconnecting means operating.

7. In a polyphase alternating current supply system, the combination, with a cable line, and section switches interpolated therein, of grounded, electromagnetically controlled, disconnecting means comprising only one disconnecting coil for opening each of the said section switches, and an electrically conducting layer in the insulation of each main conductor of the cable line connected in star connection with said disconnecting means, the current due to the potential difference between the one or more layers and the ground normally preventing said disconnecting means operating.

8. In an alternating current supply system, the combination, with a cable line, and section switches interpolated therein, of grounded, electromagnetically controlled disconnecting means comprising a grounded auxiliary source of alternating current for opening each of the said section switches, the frequency of the said auxiliary source of current being materially less than the main frequency, an electrically conducting layer in the insulation of each main conductor of the cable line connected with said disconnecting means, and a choking device interpolated between each electrically contacting layer and the appertaining disconnecting means.

9. In an electric supply system, the combination, with a cable line and section switches interpolated therein, said cable line consisting of a multiple cable comprising a plurality of metal covered cables and a common metallic outer covering surrounding and insulated from the same, of grounded, disconnecting means operatively connected with each section switch and electrically connected with the metal coverings of the said metal covered cables for automatically opening the section switches at the ends of a cable section in which a fault occurs.

In testimony whereof, I have signed my name to this specification in the presence of two witnesses.

MARTIN HÖCHSTÄDTER.

Witnesses:
 WOLDEMAR HAUPT,
 HENRY HASPER.

Copies of this patent may be obtained for five cents each, by addressing the "Commissioner of Patents, Washington, D. C."